(12) United States Patent
Fukuda et al.

(10) Patent No.: US 7,251,664 B2
(45) Date of Patent: Jul. 31, 2007

(54) VOLUME ALLOCATION WITHIN A STORAGE MANAGEMENT SYSTEM

(75) Inventors: Satoshi Fukuda, Yokohama (JP); Takuya Okamoto, Machida (JP)

(73) Assignee: Hitachi, Ltd., Tokyo (JP)

( * ) Notice: Subject to any disclaimer, the term of this patent is extended or adjusted under 35 U.S.C. 154(b) by 554 days.

(21) Appl. No.: 10/649,636

(22) Filed: Aug. 28, 2003

(65) Prior Publication Data

US 2005/0055370 A1     Mar. 10, 2005

(30) Foreign Application Priority Data

Jun. 30, 2003    (JP) .............................. 2003-186627

(51) Int. Cl.
*G06F 7/00* (2006.01)
*G06F 17/30* (2006.01)
*G06F 15/173* (2006.01)

(52) U.S. Cl. .................... 707/103 X; 707/10; 707/101; 707/104.1; 707/205; 709/225

(58) Field of Classification Search ................ 707/1, 707/103 X, 205, 200, 10, 101, 104.1; 711/12, 711/112; 369/30, 30.04; 709/225
See application file for complete search history.

(56) References Cited

U.S. PATENT DOCUMENTS

| | | | |
|---|---|---|---|
| 6,035,306 A * | 3/2000 | Lowenthal et al. ......... | 707/200 |
| 6,430,611 B1 | 8/2002 | Kita et al. | |
| 6,535,954 B2 | 3/2003 | Obara et al. | |
| 6,754,679 B2 | 6/2004 | Oheda | |
| 6,779,078 B2 * | 8/2004 | Murotani et al. ........... | 711/112 |
| 2002/0183972 A1 | 12/2002 | Enck et al. | |
| 2003/0074528 A1 | 4/2003 | Soejima et al. | |
| 2003/0093439 A1 | 5/2003 | Mogi et al. | |
| 2003/0115324 A1 | 6/2003 | Blumenau et al. | |
| 2004/0054656 A1 * | 3/2004 | Leung et al. .................. | 707/1 |
| 2004/0120225 A1 * | 6/2004 | Dalal et al. .............. | 369/30.04 |
| 2004/0122799 A1 | 6/2004 | Goyal et al. | |
| 2004/0221049 A1 | 11/2004 | Blumenau et al. | |

FOREIGN PATENT DOCUMENTS

| | | |
|---|---|---|
| JP | 10-320126 | 12/1998 |
| JP | 2001-184175 | 7/2001 |
| JP | 2003-122508 | 4/2003 |

OTHER PUBLICATIONS

"Two decades of policy-based storage management for the IBM mainframe computer", By: Ashton, Baker, Bariska, Dawson, Ferziger, Kissinger, Menendez, Shyam, Strickland, Thompson, Wilcock, and Wood, Published: Jan. 2003 http://researchweb.watson.ibm.com/journal/sj/422/ashton.html.*

* cited by examiner

*Primary Examiner*—Apu Mofiz
*Assistant Examiner*—Chelcie Daye
(74) *Attorney, Agent, or Firm*—Mattingly, Stanger, Malur & Brundidge, PC

(57) ABSTRACT

A performance margin of a disk group is calculated upon allocating volumes to disk groups based on a condition on performance requested per operating time zone of a volume designated by a client and on history information obtained from a result of actually operating the disk groups. In accordance therewith, a volume candidate is obtained, as an allocation target, from the disk groups and the obtained volume candidate is presented to the client. The client selects one of the volume candidates. It is possible to prevent deterioration in performance which is caused by excessive access performance of the allocated disk group when the volume is allocated and is operated.

20 Claims, 9 Drawing Sheets

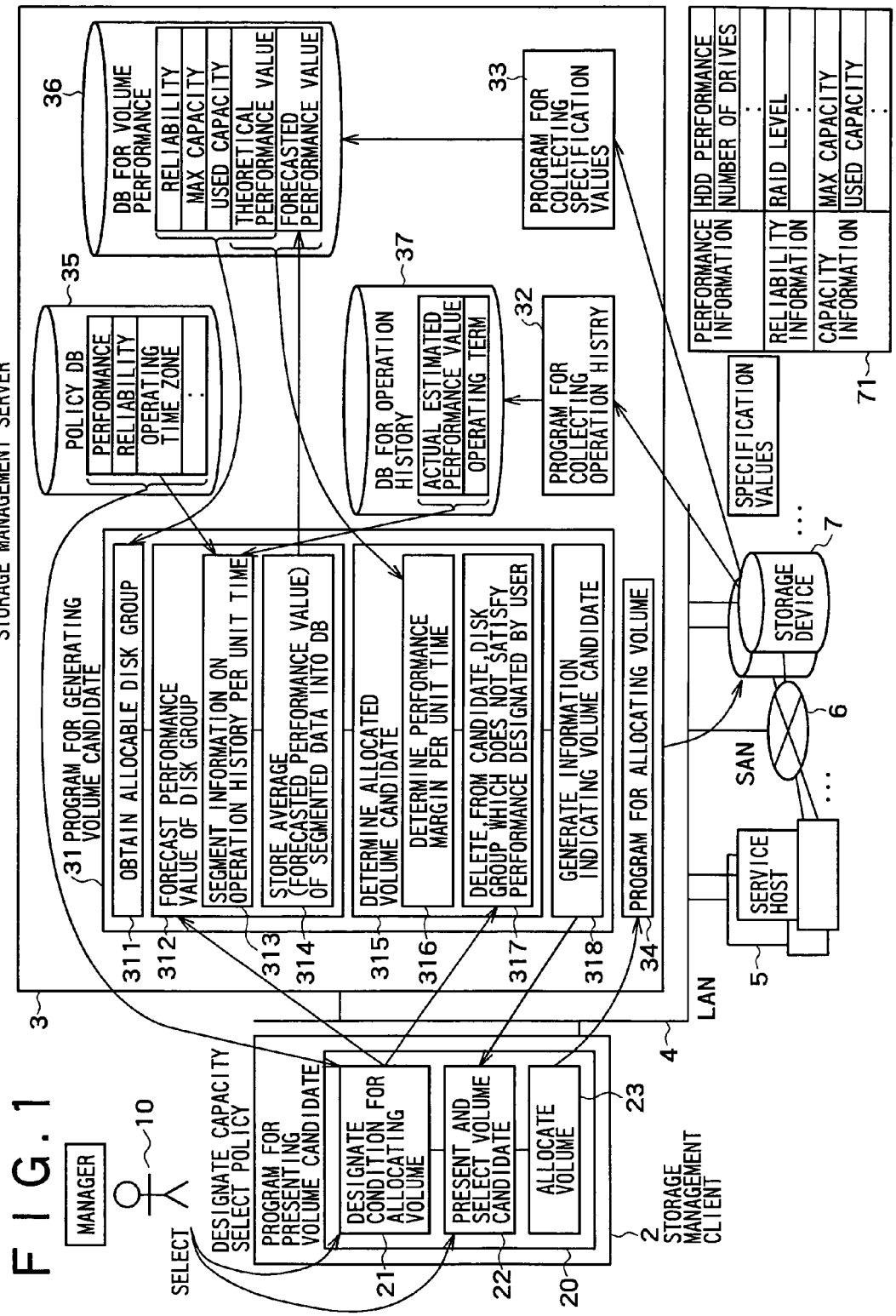

| POLICY NAME | PEAK PERFORMANCE | | LOWEST SECURITY PERFORMANCE | | RELIABILITY | OPERATING TIME ZONE | | | | ARRANGEMENT POLICY |
|---|---|---|---|---|---|---|---|---|---|---|
| | READ PERFORMANCE | WRITE PERFORMANCE | READ PERFORMANCE | WRITE PERFORMANCE | | TIME | DAY | WEEK | MONTH | |
| WEEKDAY SERVICE | 50MB/s | 10MB/s | 10MB/s | 10MB/s | mid | — | — | MON TO FRI | — | DISTRIBUTE |
| NO-SERVICE DAY BACK-UP | 25MB/s | 25MB/s | 5MB/s | 5MB/s | low | — | — | SAT AND SUN | — | CONCENTRATE |
| ACCOUNTING MONTH | 20MB/s | 50MB/s | 0MB/s | 0MB/s | high | 0:00~05:00 | 20~30 | — | 3.9 | DISTRIBUTE |

| DISK GROUP NAME (361) | RELIABILITY (362) | CAPACITY (363) | | THEORETICAL PERFORMANCE VALUE (364) | | FORECASTED PERFORMANCE VALUE (365) | | |
|---|---|---|---|---|---|---|---|---|
| | | MAX CAPACITY (3631) | USED CAPACITY (3632) | READ PERFORMANCE (3641) | WRITE PERFORMANCE (3642) | UNIT TIME (3651) | READ PERFORMANCE (3652) | WRITE PERFORMANCE (3653) |
| DISK 1 (366) | mid | 400GB | 210GB | 150MB/s | 150MB/s | MON | 80MB/s | 50MB/s |
| | | | | | | TUE | 60MB/s | 40MB/s |
| | | | | | | WED | 76MB/s | 52MB/s |
| | | | | | | THU | 72MB/s | 65MB/s |
| | | | | | | FRI | 92MB/s | 65MB/s |
| | | | | | | SAT | 100MB/s | 120MB/s |
| | | | | | | SUN | 95MB/s | 110MB/s |
| DISK 2 (367) | high | 300GB | 160GB | 120MB/s | 120MB/s | MON | 69MB/s | 50MB/s |
| | | | | | | TUE | 52MB/s | 20MB/s |
| | | | | | | WED | 40MB/s | 25MB/s |
| | | | | | | THU | 48MB/s | 23MB/s |
| | | | | | | FRI | 75MB/s | 52MB/s |
| | | | | | | SAT | 100MB/s | 120MB/s |
| | | | | | | SUN | 80MB/s | 75MB/s |

F I G. 4

37

| DISK GROUP NAME | ACTUAL ESTIMATED PERFORMANCE VALUE | | |
|---|---|---|---|
| | TIME | READ PERFORMANCE | WRITE PERFORMANCE |
| DISK 1 | 2003/2/15 5:00 | 78MB/s | 51MB/s |
| | 2003/2/15 6:00 | 78MB/s | 51MB/s |
| | : | : | : |
| DISK 2 | 2003/4/1 0:00 | 25MB/s | 18MB/s |
| | 2003/4/1 1:00 | 20MB/s | 22MB/s |
| | : | : | : |

FIG. 7

SELECT POLICY ▽      INPUT CAPACITY

| WEEKDAY SERVICE |
|---|
| WEEKDAY SERVICE |
| NO-SERVICE DAY BACK-UP |
| ACCOUNTING MONTH |

| 20 | GB ▽ |
|---|---|
|  | MB |
|  | GB |
|  | TB |

DETAILS OF POLICY

| POLICY NAME | PEAK PERFORMANCE | | LOWEST SECURITY PERFORMANCE | | RELIABILITY | OPERATING TIME ZONE | | | | ARRANGEMENT POLICY |
|---|---|---|---|---|---|---|---|---|---|---|
| | READ PERFORMANCE | WRITE PERFORMANCE | READ PERFORMANCE | WRITE PERFORMANCE | | TIME | DAY | WEEK | MONTH | |
| WEEKDAY SERVICE | 50MB/s | 10MB/s | 10MB/s | 10MB/s | mid | 9:00~17:00 | — | MON TO FRI | — | DISTRIBUTE |
| NO-SERVICE DAY BACK-UP | 25MB/s | 25MB/s | 5MB/s | 5MB/s | low | 0:00~24:00 | — | SAT AND SUN | — | CONCENTRATE |
| ACCOUNTING MONTH | 20MB/s | 50MB/s | 0MB/s | 0MB/s | high | 0:00~05:00 | 20~30 | — | 3.9 | DISTRIBUTE |

OK    CANCEL

FIG. 8

PRESENTATION OF VOLUME CANDIDATE
AND SELECTED SCREEN

THE FOLLOWING VOLUME CANDIDATES ARE
FOUND UNDER YOUR DESIGNATED CONDITION.
SELECT ALLOCATED VOLUME FROM LIST.

SELECT VOLUME

| | Name | Performance | Reliability |
|---|---|---|---|
| ☐ | Disk Group 1 @×××  | 75MB/s | mid |
| ☑ | Disk Group 3 @△△△ | 68MB/s | High |
| ☐ | Disk Group 5 @○○○ | 58MB/s | mid |
| ☐ | Disk Group 1 @××× | 55MB/s | mid |
| ☐ | Disk Group 1 @××× | 52MB/s | High |

OK    CANCEL

VOLUME ALLOCATION WITHIN A STORAGE MANAGEMENT SYSTEM

BACKGROUND OF THE INVENTION

1. Field of the Invention

The present invention relates to a storage management system and, in particular, to a volume allocating method in a technology for storage operation management on a Storage Area Network (SAN).

2. Description of the Related Art

The SAN effectively uses a large amount of data and, therefore, it is extremely widespread in recent years. The introduction of the SAN increases the flexibility of an information system in a company. However, a plurality of storage devices are connected via a fiber channel switch and this complicates the structure of the storage device. Further, the equipment setting of a system manager becomes complicated.

The central control of the storage devices causes the increase in data capacity of a single system manager. Further, this increases the types of service servers and the types of service application. In addition, the amount of data increases day by data and, therefore, the storage device is enhanced and the storage allocation to the service server is frequently executed.

In order to actually store data in the storage device, a logical area, a so-called volume needs to be allocated to the storage device. The allocation of volume needs not only the designation of storage device but also the designation of disk group in the storage device, namely, group of disks forming RAID structured by collecting a plurality of disk devices.

One well-known technology for central control of the complicated storage devices is disclosed in U.S. Pat. Publication No. 6,430,611 (Patent Reference 1). According to the technology disclosed in U.S. Pat. Publication No. 6,430,611, a computer for managing a data area in the storage device is connected to the storage devices connected to the SAN, and agents for collecting information on the storage devices operated therein are arranged. A single management server for communication with the agents is provided and, thus, it can manage the entire storage devices in a network (refer to the 56th line in the first paragraph to the 36th line in the second paragraph in U.S. Pat. Publication No. 6,430,611).

A plurality of volumes can be arranged in the single disk group and, therefore, the simultaneous access to a plurality of volumes in the single disk group reduces the individual volume performance. One technology for reducing the load of volume in the single disk group is disclosed in U.S. Pat. Publication. No. 6,535,954 (Patent Reference 2) (corresponding to Japanese Unexamined Patent Application Publication No. 11-296313). According to the technology disclosed in U.S. Pat. Publication. No. 6,535,954, the load is concentrated to the disk group and, when one disk control device has excessive load prior to the load of the disk group, the management of the disk group or volume shifts to another disk control device, thereby exhibiting the maximum performance of the disk group or volume (refer to the 17th to 27th lines in the third paragraph in U.S. Pat. Publication. No. 6,535,954).

Further, Japanese Unexamined Patent Application Publication No. 2001-184175 (Patent Reference 3) discloses a technology for storing the history of access information to the storage device and for forming a candidate of new logical-disk-structure based on the analysis result of the history information so as to restructure the logical disk structure in which the access performance is improved and the using efficiency of the disk area is increased.

The complexity of the structure of storage device complicates a volume management method. Therefore, the solution of the above problem is demanded.

However, U.S. Pat. Publication. No. 6,430,611 discloses that the single management server can monitor the complicated storage devices. However, a volume management method is not disclosed.

Further, according to U.S. Pat. Publication. No. 6,535,954, the maximum performance of the disk group is exhibited. However, there is a problem that a plurality of volumes are arranged in the disk group and the requested performance is not exhibited when the disk group has the load of the maximum performance or more.

When the number of accesses over the theoretical maximum performance of the disk group is requested to a plurality of volumes formed in the disk group, the disk group cannot satisfy the requested performance. Thus, preferably, upon allocating the volume, the disk group can be selected so as to prevent the excessive performance of the disk group by allocating the volume.

Further, the allocation of volume for requesting the higher performance needs the efficient allocation of volume so as to remain the disk group for non-allocation as much as possible.

The technology disclosed in Japanese Unexamined Patent Application Publication No. 2001-184175 pays attention to the increasing ratio of the used disk capacity. However, the candidate of the new logical-disk structure is not determined by paying attention to the performance and the reliability. Further, Japanese Unexamined Patent Application Publication No. 2001-184175 does not describe a method for systematically allocating the volume before operation while anticipating the deterioration in performance.

SUMMARY OF THE INVENTION

It is one object of the present invention to prevent the deterioration in performance which is caused by the excessive access performance of the allocated disk group when the volume is allocated and is actually operated.

It is another object of the present invention to efficiently allocate the volume based on operation history of the volume so as to prevent the disk group from having its performance which is over the maximum one.

According to the present invention, a storage management server comprises: a database for operation history which stores, as history, information including a performance value of a disk group obtained upon operating the storage device; a database for a volume performance value which stores information on specification values including performance, reliability, and a capacity of the storage device obtained from the storage device; a policy database which stores information on policies including the performance corresponding to a plurality of set policies; first processing means which calculate a forecasted performance value from the information on the performance value of the disk group stored in the database for operation history; second processing means which obtain a performance margin, based on a theoretical performance value of the volume and the forecasted performance value obtained by the first processing means; and volume determination processing means which determine an allocation candidate of the volume in accordance with the calculation result of the second processing means.

The first processing means calculate the forecasted performance value per unit time based on information on the performance value obtained from the database for operation history, and the database for a volume performance value stores information on the forecasted performance value per unit time obtained by the first processing means, corresponding to the disk group.

The second processing means perform processing for obtaining the difference between the performance margin per unit time and the designated performance value stored in the policy database, and the volume determination processing means determine, as the allocation candidate, the volume which is obtained by the second processing means and has a positive difference.

According to the present invention, the storage management server further comprises: means which transmit information indicating the volume candidate determined by the volume determination processing means so as to display the information on a client connected to the storage management server; and means which receive the information on the volume allocation selected by the client in accordance with the displayed information.

Further, according to the present invention, in a storage management system, a client comprises: means which designate and input the condition for allocating the volume; display means that display the information indicating the volume candidate determined by the volume determination processing means; and means which transmit, to the storage management server, the information on the volume allocation selected from the volume information of the allocation candidate displayed on display means.

Furthermore, the present invention can be applied to a program. That is, there is provided a program for selecting and generating a volume candidate functioning on a storage management server having a database on operation history for storing, as history, information including a performance value of a disk group obtained by operating a storage device connected via a network, a database for a volume performance value for storing information on specification values including performance, reliability, and a capacity of the storage device, obtained from the storage device, and a policy database for storing information on a policy including the performance corresponding to a plurality of set policies. The program for generating the volume candidate comprises: a first processing step of calculating a forecasted performance value from the information on the performance value of the disk group stored in the database on the operation history; a second processing step of obtaining a performance margin based on a theoretical performance value of the volume and the forecasted performance value obtained by the first processing step; a volume determination processing step of determining a candidate for allocating the volume in accordance with the calculation result of the second processing step; and a step of generating information for displaying the volume candidate from information based on the volume determination processing step, so as to display the volume candidate on a client connected to the storage management server.

In addition, the present invention can be applied to a volume allocating method in a storage management system. According to the present invention, there is provided a volume allocating method in a storage management system for managing the operation of a storage device connected via a network by use of a storage management server. The volume allocating method comprises receiving, via the network, a condition for allocating a volume designated by a client; obtaining information on operation history of the volume from a memory device for storing, as history, information including a performance value of the disk group obtained upon actually operating the storage device; obtaining information on specification values including the performance value of the storage device; assuring a performance margin and determining a candidate of an allocable volume in accordance with the received condition for allocating the volume based on the information on the operation history of the volume and the information on the storage device; transmitting information on the volume of the allocated candidate to the client; receiving information on volume allocation selected and transmitted from the information on the volume of the allocated candidate in the client; and allocating the volume to the storage device in accordance with the information on the volume allocation.

The volume allocating method further comprises: previously storing, in the memory device, a plurality of policies one of which is selected by designating the condition for allocating the volume in the client, including at least the performance value and an operating time zone; and previously storing, in the memory device, information on a forecasted performance value per unit time which is calculated from a capacity, a theoretical performance value, and information on the operation history of the volume of the disk group as an allocation target.

The step of determining the volume candidate comprises: obtaining the performance margin based on the theoretical performance value and the forecasted performance value per unit time of the volume included in the disk group; calculating and subtracting the performance value designated by the policy from the obtained performance margin; and a step of determining, as the allocation candidate, the volume of the disk group when the obtained value is positive as the calculation result.

In the volume allocating method according to the preferred embodiment, the new volume is allocated to a disk group and the performance necessary for the disk group is obtained based on information on the operation history of the disk groups and on the operating schedule of the newly-allocated volume. Consequently, it is possible to determine whether or not the disk group satisfies the performance necessary for the allocated volume upon allocating the volume.

Further, in the volume allocating method according to the present invention, the volume as the allocation target is selected based on information on performance necessary for the obtained performance and information on the disk group executable performance. Consequently, upon allocating the volume which satisfies the newly-requested performance, the disk group for allocation is selected while the disk group having the higher performance remains.

The operating state of volume is not constant but changes depending on services to which the volume is allocated. As a result of using the abovementioned method, a plurality of volumes having the different operating states can be allocated to the single disk group so as to prevent the synchronicity of their using peaks, and the performance necessary for the volume can be satisfied if the disk group has the performance which is lower than the required performance obtained from the peak performance for the services.

BRIEF DESCRIPTION OF THE DRAWINGS

FIG. 1 is a diagram showing the structure of a storage management system used for the SAN and the outline of a processing sequence thereof according to an embodiment of the present invention;

FIG. 2 is a policy table of a policy database 35 in the storage management system according to the embodiment;

FIG. 3 is a table of a database 36 for a volume performance value in the storage management system according to the embodiment;

FIG. 4 is a table of a database 37 for operation history in the storage management system according to the embodiment;

FIG. 7 is a diagram showing an example of a display screen for designating a condition for allocating the volume according to the embodiment;

FIG. 8 is a diagram showing the presentation of the volume candidate and a selected screen according to the embodiment.

DESCRIPTION OF PREFERRED EMBODIMENTS

Figure 5:
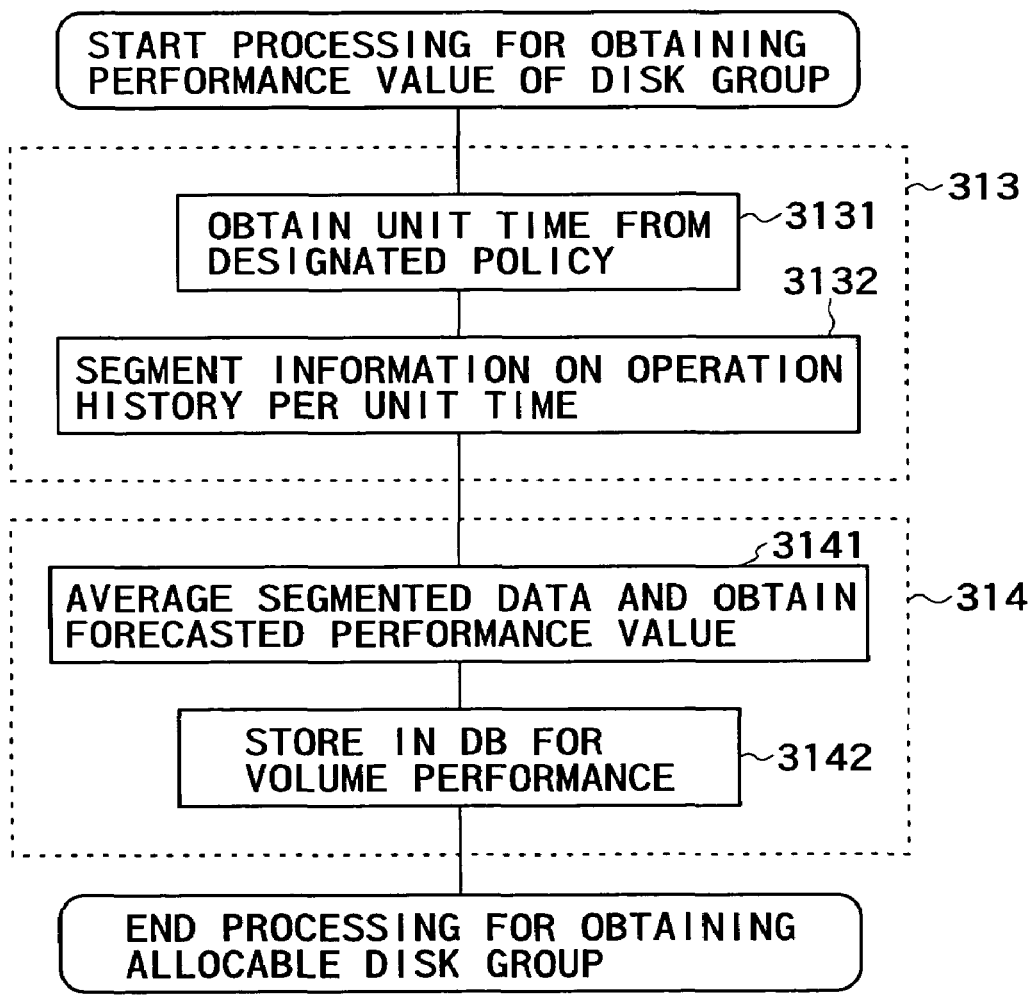
FIG. 5 is a flowchart for processing for obtaining a performance value of a disk group according to the embodiment.

A detailed description is given of an embodiment of the present invention with reference to the drawings.

FIG. 1 is a diagram showing the structure of a storage management system used for the SAN and the outline for processing sequence thereof.

The storage management system comprises: a storage management client 2; a storage management server 3; a service host 5; and a storage device 7. These components in the storage management system are connected by a LAN (Local Area Network) 4, and information is referred to and management information is set between the devices via the LAN 4. The service host 5 is connected to the storage device 7 via an SAN 6, thereby receiving and transmitting data used for the service via the SAN 6.

The storage management client 2, such as a personal computer, comprises: a display device for displaying information; an input device, e.g., a keyboard or a mouse; a memory device, e.g., a hard disk device (HDD); a processor; and an internal memory. The memory device prepares and stores a program 20 for presenting a volume candidate. The program 20 for presenting the volume candidate is loaded to the internal memory and is executed by the processor upon allocating the volume candidate. An operating manager 10 inputs data on the allocation of volume candidate to the input device. A display screen of the display device displays information on the volume candidate received from the storage management server 3, and presents the volume candidate to the operating manager 10.

A description is given of functions of the program 20 for presenting the volume candidate on the storage management client 2. The program 20 for presenting the volume candidate first receives an input of a condition for allocating the volume from the operating manager 10 on processing 21 for designating the condition for allocating the volume, and transmits the designated condition to a program 31 for generating the volume candidate in the storage management server 3.

The program 31 for generating the volume candidate generates the volume candidate and transmits the volume candidate to the program 20 for presenting the volume candidate. In processing 22 for presenting and selecting the volume candidate, the execution of the program 31 for generating the volume candidate is waited and the generated volume candidate is received. The received volume candidate is displayed on the display screen and the volume candidate is presented to the operating manager 10. The operating manager 10 selects a proper volume from the displayed candidates. In processing 23 for allocating the volume, a request for allocating the volume selected and inputted by the operating manager 10 is transmitted to the storage management server 3.

The storage management server 3 has the storage device. Further, the storage management server 3 prepares and stores the program 31 for generating the volume candidate, a program 32 for collecting the operation history, a program 33 for collecting specification values, and the program 34 for allocating the volume. These programs are executed by a processing device (not shown). Further, the memory device comprises a policy database (DB) 35, a database (DB) 36 for a volume performance value, and a database (DB) 37 for the operation history. Memory formats of the databases 35 to 37 are described in detail later. Further, the characteristic functions and operations of the program 31 for generating the volume candidate will be described in detail later.

The program 31 for generating the volume candidate obtains information from the databases 35 to 37 based on the condition for allocating the volume which is received from the storage management client 2, generates the volume candidate, and sends the generated volume candidate to the storage management client 2. The program 32 for collecting the operation history collects the operation history of the storage device 7, and stores the collected operation history to the database 37 for the operation history. The program 33 for collecting the specification values collects the specification values of the storage device 7, and stores the collected specification values to the database 36 for the volume performance value. The program 34 for allocating the volume receives the request for allocating the volume transmitted from the storage management client 2, and allocates the volumes to the storage device 7.

A description is given of the functions of the program 31 for generating the volume candidate on the storage management server 3.

In processing 311 for obtaining an allocable disk group, the program 31 for generating the volume candidate performs processing for allocating the candidate of the allocable disk group based on the condition for allocating the volume of the operating manager 10 received from the program 20 for presenting the volume candidate and on specification values 71 for obtaining from the storage devices. In processing 312 for forecasting the performance value of the disk group, the program 31 for generating the volume candidate forecasts the performance of the disk-group candidate based on the performance value which is actually obtained from the database 37 for the operation history, and stores the forecasted performance value into the database 36 for the volume performance value. In processing 315 for determining the allocated candidate volume, the program 31 for generating the volume candidate determines the disk group matching the condition for allocating the volume designated by the operating manager 10 from the forecasted disk-group candidates. If a plurality of the determined disk groups exist, in processing 318 for generating information indicating the volume candidate, the program 31 for generating the volume candidate arranges the disk groups in accordance with the performance of the disk groups and the arrangement designated by the policy, and transmits the arranged disk groups to the program 20 for presenting the volume candidate.

A detailed description is given of the flow for designating the condition for allocating the volume by the operating manager 10 and for actually allocating the volume by the storage management server 3 in the storage management client 2 in order of processing 21, 311 to 318, and 22 to 23 shown in FIG. 1.

In processing 21 for designating the condition for allocating the condition, a policy list having a description of the condition for allocating the volume is obtained from the policy database 35, displays the obtained policy list on a display screen of the storage management client 2, and presents it to the operating manager 10.

FIG. 7 shows a display example of a display screen for designating the condition for allocating the volume.

The display screen displays detailed contents of the policy, an index for selecting the policy, and an index for designating and inputting the memory capacity. Information on the policy is preset and is stored in the policy database 35.

The operating manager 10 selects the policy matching the allocated volume from the policy list displayed on the display screen on the program 20 for presenting the volume candidate by use of the input device. In addition, the memory capacity of the allocated volume is designated. The capacity of volume is designated to "20 GB" by, e.g., pulling down from the preset display. The program 20 for presenting the volume candidate transmits the selected and inputted policy and the designated volume capacity to the storage management server 3. The policy and volume capacity may directly be inputted by the input device, not by a pull-down system.

FIG. 2 shows an example of a policy table stored in the policy database 35.

The policy comprises indexes of: a policy name 351; peak performance 325; lowest-security performance 353; reliability 354; and operating time 355. The policy is previously formed by the operating manager 10 before starting the operation of volume, and is stored in the policy database 35. The policy name 351 is named by the operating manager 10. The peak performance 352 is obtained by designating, by the operating manager 10, the performance to be secured at the time for operating the allocated volume. The lowest-security performance 353 is designated by the operating manager 10 when he desires the security of the performance except for the operating time of the allocated volume. The peak performance 352 and the lowest-security performance 353 are defined to be divided into read performances 3521 and 3531 and write performances 3522 and 3532, respectively.

The reliability 354 is performance of the storage for arranging the allocated volume. Upon defaulting the disk forming RAID, the restoring operation of data depends on the RAID level. Therefore, the reliability 354 is determined depending on the type of RAID. For example, RAID 1 denotes "high", RAID 5 denotes "mid" (middle), and RAID 0 denotes "low".

The operating time 355 is determined by designating the time for operating the allocated volume on unit basis of time 3551, day 3552, week 3553, and month 3554. For example, according to a policy 357 for weekday service, the read performance of the peak time is 50 MB/s, the write performance thereof is 10 MB/s, the read performance and the write performance except for the operating time are 10 MB/s, respectively, the reliability is "mid" (middle), and the operating time is 9:00 to 17:00 on Monday to Friday.

A description returns to the functions of the program 31 for generating the volume candidate shown in FIG. 1.

In processing 311 for obtaining the disk group, the storage management server 3 forms a list of the disk group which satisfies an input condition which is transmitted from the program 20 for presenting the volume candidate of the storage management client 2. The list includes all the disk groups which are registered in the database 36 for the volume performance value. The database 36 for the volume performance value stores information on the performance value of all the disk groups of the storage device 7 that can be accessed from the storage management server 3.

FIG. 3 shows an example of a table for performance-value information of the disk groups stored in the database 36 for the volume performance value.

The information of the disk groups includes a disk group name 361, reliability 362, a capacity 363, a theoretical performance value 364, and a forecasted performance value 365. The disk group name 361 indicates a name of the disk group. The reliability 362 indicates a default ratio of the disk group. The capacity 363 comprises a maximum capacity 3631 and a used capacity 3832, indicating the maximum capacity and the currently used capacity of the disk group.

The program 33 for collecting the specification values calculates the theoretical performance value 364 based on the specification values 71 of the storage such as the performance of HDD, the number of drives, and the RAID level, and stores the calculated theoretical performance value 364 in the database 36 for the volume performance value. When the disk group of the RAID 0 comprises four drives having the performance of 50 MB/s, the theoretical performance value is 200 MB/s (=50×4). The theoretical performance value 364 comprises read performance 3641 and write performance 3642, and indicates the performance values upon reading time and writing time at which the disk group theoretically exhibits the maximum performance.

The forecasted performance value 365 comprises unit time 3651, read performance 3652, and write performance 3653, and indicates the forecasted performance value of the disk group per unit time. The forecasted performance value 365 is calculated from the information on the operation history and is obtained by calculating and forecasting the performance of the disk group upon allocating the volume based on the performance history. Since the performance of the disk group is known by estimation, the performance of the disk group upon allocating the volume is not forecasted. Then, it is assumed that the performance of the disk group upon allocating the volume is forecasted based on the information on the operation history of the storage. The information on the operation history is stored so that the actual estimated performance value of the disk group corresponds to the operating time.

FIG. 4 shows an example of a table for the information on the operation history of the disk group stored in the database 37 for the operation history.

Information of the disk group comprises a disk group name 371, and an actual estimated performance value 372. The disk group name 371 indicates the name of the disk group. The actual estimated performance 372 comprises time 3721, read performance 3722, and write performance 3723, and indicates time for estimating the performance of the disk group and an estimated value. The forecasted performance value 365 is obtained by segmenting the actual estimated performance value 372 per unit time and averaging it. For example, when the operation history is one month and the unit time is the day of week, the operation history is segmented per day of the week and is averaged per day of week. The forecasted performance value 365 and the unit time will be described in detail later. The reliability 362, capacity 363, and theoretical performance value 364 are obtained by collecting and processing the specification values of the storage device 7 on the program 33 for collecting the specification values and are stored in the database 36 for the volume performance value.

The list of the disk groups are obtained by comparing the disk groups under the following conditions (1) to (3) and by registering the disk groups which satisfy the entire conditions (1) to (3). The conditions (1) to (3) are as follows.

(1) Disk group having the reliability 362 more than the reliability designated as the input condition.

(2) Disk group in which the addition capacity of that designated as the input condition and of that used by the existing volume in the disk group is not over the maximum capacity 363 thereof.

(3) Disk group having the theoretical performance 364 value which is not less than the performance designated as the input condition.

FIG. 5 shows an operation flowchart of the processing 312 for forecasting the disk-group performance value. The processing 312 for forecasting the disk-group performance value comprises processing 313 for extracting the information on the operation history of the disk groups from the database 37 for the operation history and for segmenting data per unit time, and processing 314 for averaging the segmented data and for storing the average into the database 36 for the volume performance value as the forecasted performance value.

In the processing 313 for segmenting the information on the operation history per unit time, the unit time is obtained from the operating time zone of the designated policy (3131) and the information on the operation history is segmented per unit time (3132). If the operating time zone is designated by hour unit, day unit, week unit, or month unit, "hour", "day", "day of week", or "month" is the unit time, respectively. In an example of the policy 357 for "weekday service" shown in FIG. 2, the operation time zone is designated by the week unit and the unit time is "day of week". A plurality of indexes are designated to the operating time zone and, in this case, the shortest time becomes the unit time. In an example of the "accounting month" 359 shown in FIG. 2, the unit time becomes "hour".

In processing 314 for averaging the segmented data and for storing the average, as the forecasted performance value, into the database 36 for the volume performance value, the average at the time is calculated based on the segmented information on the operation history and the calculated average is obtained as the forecasted performance value (3141), and the forecasted performance value is stored in the database 36 for the volume performance value (3142).

A description is given of a method for obtaining the forecasted performance value by use of the policy 357 for "weekday service" shown in FIG. 2 and the volume performance value in the disk 1 shown in FIG. 3. In the designated policy, the operating time zone is designated by week unit. Consequently, in the processing 312 for forecasting the disk-group performance value, the operation history is segmented on each of Monday to Sunday, the performance value is averaged per day of week, and the forecasted performance value is stored in the database 36 for the volume performance value.

Figure 6:
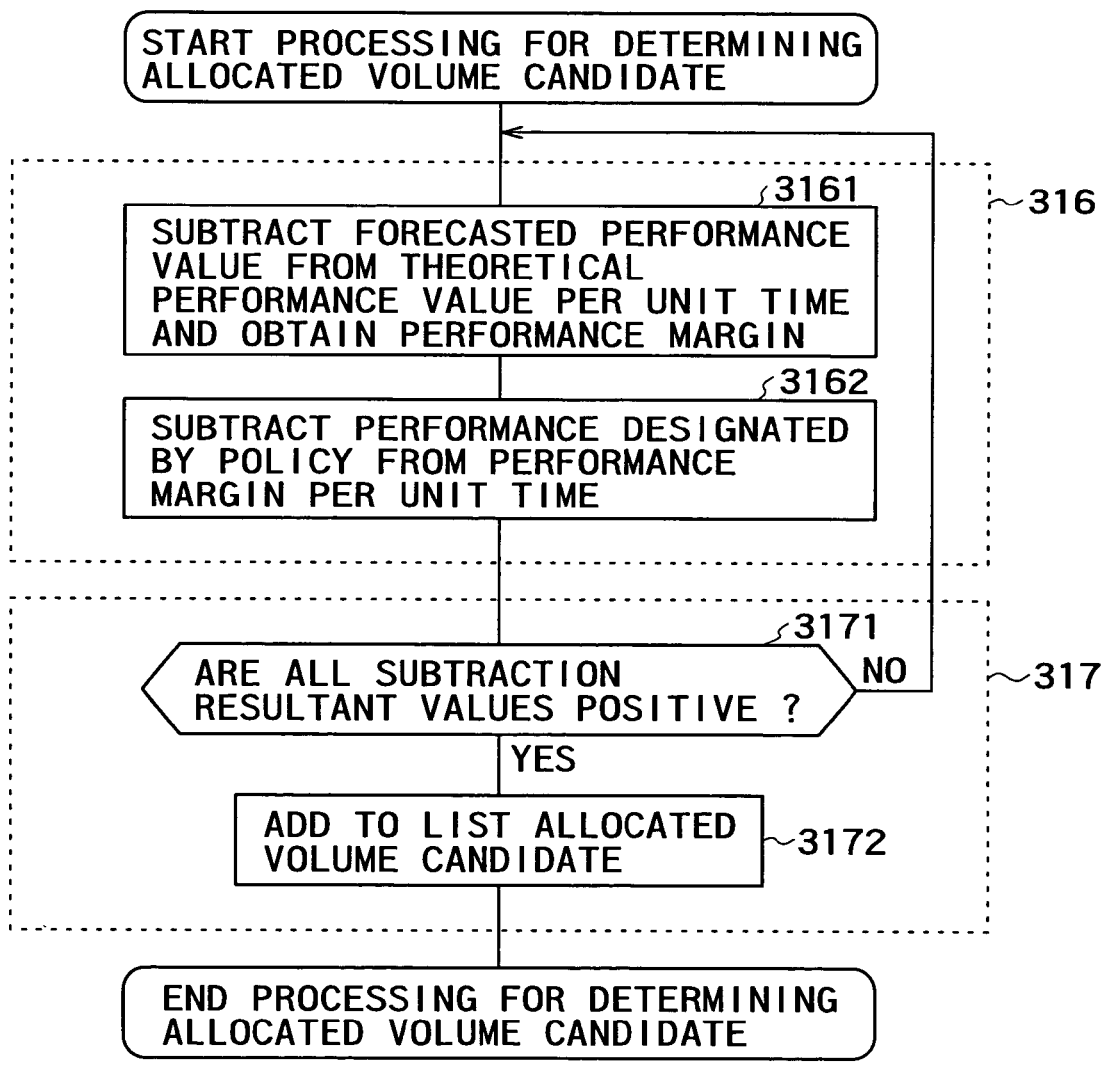
FIG. 6 is a flowchart for processing for determining the volume of an allocated candidate according to the embodiment.

FIG. 6 shows an operation flowchart of the processing 315 for determining the allocated candidate volume. The processing 315 for determining the allocated candidate volume comprises processing 316 for obtaining a performance margin per unit time and processing 317 for deleting, from the candidates, the disk group which does not satisfy the performance designated by the user.

The processing 316 for obtaining the performance margin per unit time is divided into processing 3161 for subtracting the forecasted performance value from the theoretical performance value per unit time so as to obtain the performance margin and processing 3162 for subtracting the performance value designated by the policy from the performance margin per unit time. In the processing 3161 for subtracting the forecasted performance value from the theoretical performance value per unit time, the forecasted performance value is subtracted from the theoretical performance value 364 extracted from the database 36 for the volume performance value so as to obtain the performance margin of the disk group per unit time. In the processing 3162 for subtracting the performance value designated by the policy from the performance margin per unit time, the performance value designated by the policy is subtracted from the performance margin per unit time obtained in the processing 3161 for subtracting the forecasted performance value from the theoretical performance value per unit time, and the performance value remaining in the disk group is obtained upon allocating the volume. The performance value designated by the policy includes two types of peak performance 342 and lowest-security performance 343. The performance value assured at the operating time zone is designated to the peak performance 342 and the performance value secured as the lowest level is designated to the lowest-security performance 343 at the time except for the operating time zone.

The processing 317 for deleting, from the candidates, the disk group which does not satisfy the performance designated by the user is divided into processing 3171 for determining whether or not all the subtracted values are positive and processing 3172 for adding the disk group to the candidate list for allocating the volume.

In the processing 3171 for determining whether or not all the subtracted values are positive, it is determined whether or not positive are all the performance values remaining in the disk group per unit time, which are obtained in the processing 316 for obtaining the performance margin per unit time, or whether or not only one negative performance-value exists. If it is determined that all the performance values are positive, the disk group is added to the candidate list for allocating the volume (3172). If it is determined that even one performance value is negative, the disk group is not added to the candidate list for allocating the volume and the processing 315 for determining the allocated candidate volume of the remaining disk groups is repeated.

Figure 9:
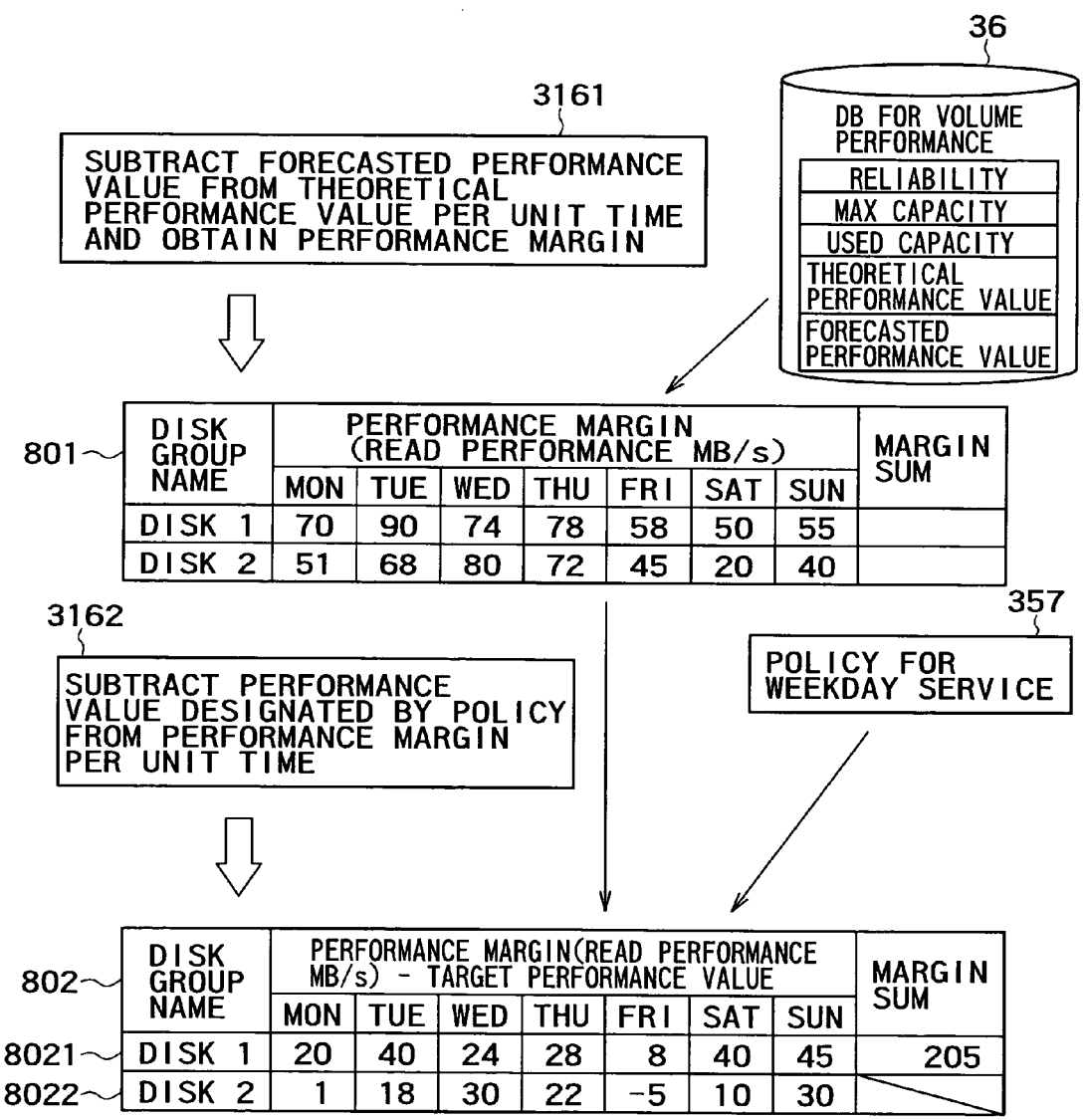
FIG. 9 is a diagram showing an example of calculating a performance margin according to the embodiment.

Next, a description is given of an example of calculating the performance margin in the processing 315 for determining the allocated candidate volume with reference to FIG. 9.

First, a description is given of a method for calculating the performance margin using the policy 357 for weekday service shown in FIG. 2 and the database 36 for the volume performance value shown in FIG. 3.

Through processing 3161 for subtracting the forecasted performance value from the theoretical value per unit time to obtain the performance margin, a performance margin 801 per unit time is calculated. Further, a target performance value designated by the policy is subtracted from the performance margin 801, thereby obtaining the performance value remaining in the disk group upon allocating the volume. Since a disk 2 (8022) includes a negative value, it is understood that the disk 2 does not become the candidate for allocating the volume.

In the processing 318 for generating information indicating the volume candidate, information is generated to display the volume candidate on the display screen of the storage management client 2. When a plurality of volume candidates exist in the candidate list for the volume, the volume candidates need to be arranged upon displaying them on the display screen. The arrangement is performed based on the arrangement policy 356 in the policies (refer to FIG. 2) and the performance margin obtained in the processing 315 for determining the allocated candidate volume.

The arrangement policy 356 has two policies of concentration and distribution. The concentration means that the volumes are arranged to be concentrated to one disk group as much as possible so that the disk performance is effectively utilized. For example, the concentration is used upon arranging the volumes having the low access-times (low frequency of access) to the single disk group in a lump. The distribution means that the volumes are arranged prior to an unused disk group. For example, the distribution is used upon distributing and arranging the volumes having the high frequency of access to the different disk groups. In the case of using the concentration as the arrangement policy 356, the volumes are arranged in order of the small sum of performance margins. In the case of using the distribution as the arrangement policy 356, the volumes are arranged in order of the large sum of performance margins. The storage management server 3 transmits the candidate list for the volume to the storage management client 2.

In the processing 22 for presenting and selecting the volume candidate, the volume-candidate list transmitted from the program 31 for generating the volume candidate is displayed on the display screen of the storage management client 2, and is presented to the operating manager 10.

FIG. 8 is a diagram showing an example of the screen structure used in the processing 22 for presenting and selecting the volume candidate. The operating manager 10 instructs and selects, by use of the input device, one volume candidate from the candidate list for allocating the volume displayed on the display screen. If a request is transmitted from the operating manager 10 in this case, the volume candidates can be sorted in order of the performance or of the reliability. In the processing 23 for allocating the volume, the selected volume candidate is actually allocated to the storage device 7.

The above-designated information on the candidate for allocating the volume is transmitted to the storage management server 3 from the storage management client 2. On the program 34 for allocating the volume, the volume allocating processing is performed to the storage device 7.

As mentioned above, according to the embodiment, upon allocating the volume, the performance margin is calculated based on the performance value of the newly-allocated volume and on the performance value of the existing volume obtained from the information on the operation history, thereby enabling the calculation of the volume as the allocated candidate so as to prevent its performance value which is over the maximum performance of the disk group. Consequently, the volume is efficiently and deliberately allocated, e.g., the volume operated on the weekday and the volume operated on the holiday are allocated to the single storage device.

As mentioned above, the embodiment of the present invention is described. However, the present invention is not limited to this and is variously modified.

The table formats of the databases 35 to 37 are not limited to those described above. The index of the arrangement policy 356 is not necessary in the table of the policy database 35.

Further, in the table of the database 36 for the volume performance value, the unit time in the forecasted performance value 365 is not limited to month, week, day of week, and hour, and can be prescribed, e.g., every three days, every weekend, or every eight hours a day.

According to the present invention, advantageously, it is possible to prevent the deterioration in performance which is caused by the excessive access performance of the allocated disk group when the volume is allocated and is then operated.

What is claimed is:

1. A volume allocating method in a storage management system for managing operation of a storage device connected via a network by use of a storage management server, the volume allocating method comprising:

receiving, via the network, a condition for allocating a volume, wherein the condition is designated by a client;

obtaining information on operation history of the storage device from a memory device for storing, as history, information including a performance value of a disk group obtained upon actually operating the storage device;

obtaining from the storage device information on specification values including a performance value of the storage device;

determining at least one candidate of an allocable volume by obtaining a performance margin and using the performance margin to determine the at least one candidate of an allocable volume in accordance with the received condition for allocating the volume and based on the information on the operation history of the storage device and the information on specification values of the storage device;

transmitting information on the volume of the at least one candidate to the client;

receiving the information on the volume of the at least one candidate in the client;

receiving from the client a request to allocate a volume selected from the at least one candidate;

allocating the volume to the storage device in accordance with the information on the volume selected from the at least one candidate;

storing previously, in the memory device, a plurality of policies, one of which is selected by designating the condition for allocating the volume in the client, wherein each of the plurality of policies includes information on at least the performance value and an operating time zone; and storing previously, in the memory device, information on a forecasted performance value per unit time, a theoretical performance value, and information on the operation history of the volume of the disk group as an allocation target, wherein the forecasted performance value is an average performance value per unit time based on the operation history of a capacity, wherein the theoretical performance value is a performance value at which the disk group theoretically exhibits maximum performance, and wherein the performance value at which the disk group theoretically exhibits maximum performance is obtained by multiplying the number of drives in the disk group by the performance of each drive.

2. A volume allocating method according to claim 1, wherein the step of determining the at least one candidate further comprises:

obtaining the performance margin by using the theoretical performance value and the forecasted performance value per unit time of the volume included in the disk group;

subtracting the performance value designated by the policy from the obtained performance margin; and determining, as the at least one candidate, the volume of the disk group when the obtained value is positive as a result of the subtraction.

3. A storage management server for managing the operation of a storage device connected via a network, the storage management server comprising:

a database for operation history which stores, as history, information including a performance value of a disk group obtained upon operating the storage device;

a database for a volume performance value which stores information on specification values including performance, reliability, and a capacity of the storage device obtained from the storage device;

a policy database which stores information on policies including the performance corresponding to a plurality of set policies;

first processing means which calculates a forecasted performance value from the information on the performance value of the disk group stored in the database for operation history, wherein the forecasted performance value is an average performance value per unit time based on the operation history;

second processing means which obtains a performance margin by using a theoretical performance value of the volume and the forecasted performance value obtained by the first processing means, wherein the theoretical performance value is a performance value at which the disk group theoretically exhibits maximum performance, and wherein the performance value at which the disk group theoretically exhibits maximum performance is obtained by multiplying the number of drives in the disk group by the performance of each drive; and volume determination processing means which determines at least one allocation candidate for allocating the volume in accordance with a calculation result of the second processing means.

4. A storage management server according to claim 3, wherein the first processing means calculates the forecasted performance value per unit time based on information on the performance value obtained from the database for operation history, and wherein the database for a volume performance value stores information on the forecasted performance value per unit time obtained by the first processing means, corresponding to the disk group.

5. A storage management server according to claim 3, wherein the second processing means performs processing for obtaining a difference between the performance margin per unit time and a designated performance value stored in the policy database, and wherein the volume determination processing means determines, as the at least one allocation candidate, the volume which is obtained by the second processing means when the difference which is obtained is positive.

6. A storage management server according to claim 3, further comprising:

means for transmitting information indicating a volume candidate determined by the volume determination processing means so as to display the information on a client connected to the storage management server; and means for receiving the information on the volume allocation selected by the client in accordance with the displayed information.

7. A system having a storage management server according to claim 3, wherein the storage management server has a client connected thereto via the network, and wherein the client comprises:

means for designating and inputting a condition for allocating the volume;

means for displaying information indicating the at least one allocation candidate determined by the volume determination processing means; and means for transmitting to the storage management server, the information on the volume allocation selected from the volume information of the at least one allocation candidate displayed on the means for displaying.

8. A program for selecting and generating at least one volume candidate functioning on a storage management server, the storage management server comprising a database on operation history for storing, as history, information including a performance value of a disk group obtained by operating a storage device connected via a network, a database for a volume performance value for storing information on specification values including performance, reliability, and a capacity of the storage device, obtained from the storage device, and a policy database for storing information on a policy including the performance corresponding to a plurality of set policies, the program for generating the at least one volume candidate comprising:

a first processing step of calculating a forecasted performance value from the information on the performance value of the disk group stored in the database on the operation history, wherein the forecasted performance value is an average performance value per unit time based on the operation history;

a second processing step of obtaining a performance margin based on a theoretical performance value of the volume and the forecasted performance value obtained in the first processing step, wherein the theoretical performance value is a performance value at which the disk group theoretically exhibits maximum performance, and wherein the performance value at which the disk group theoretically exhibits maximum performance is obtained by multiplying the number of drives in the disk group by the performance of each drive;

a volume determination processing step of determining the at least one volume candidate for allocating the volume in accordance with a calculation result of the second processing step; and a step of generating information for displaying the least one volume candidate from information based on the volume determination processing step, so as to display the at least one volume candidate on a client connected to the storage management server.

9. A volume allocating method in a storage management system for managing operation of a storage device connected via a network by use of a storage management server, the volume allocating method comprising:

receiving, via the network, a condition for allocating a volume, wherein the condition is designated by a client;

obtaining information on operation history of the storage device from a memory device for storing, as history, information including a performance value of a disk group obtained upon actually operating the storage device;

obtaining from the storage device information on specification values including a performance value of the storage device;

determining at least one candidate of an allocable volume by obtaining a performance margin and using the performance margin to determine the at least one candidate of an allocable volume in accordance with the received condition for allocating the volume and based on the information on the operation history of the storage device and the information on specification values of the storage device;

transmitting information on the volume of the at least one candidate to the client;

receiving the information on the volume of the at least one candidate in the client;

receiving from the client a request to allocate a volume selected from the at least one candidate;

allocating the volume to the storage device in accordance with the information on the volume selected from the at least one candidate;

previously storing, in a memory device of the storage management server, a plurality of policies including information on at least the performance value and the operating time zone;

previously storing, in the memory device of the storage management server, information on a forecasted performance value per unit time, theoretical performance value, and volume of the disk group as the allocation target, wherein the forecasted performance value is an average performance value per unit time calculated using information on the operation history of a capacity, and wherein the theoretical performance value is a performance value at which the disk group theoretically exhibits maximum performance, and wherein the performance value at which the disk group theoretically exhibits maximum performance is obtained by multiplying the number of drives in the disk group by the performance of each drive;

displaying, on a display screen of the client, information on the plurality of policies transmitted from the storage management server;

selecting one policy by use of input means of the client, from the plurality of policies displayed on the display screen;

displaying, on the display screen, volume information of the received allocated at least one candidate;

selecting and designating one of the allocated at least one candidate displayed on the display screen; and transmitting, to the storage management server, information on the designated allocated at least one candidate.

10. A storage management server for managing operation of a storage device connected via a network, comprising:

a database for operation history which stores, as history, information including a performance value of a disk group obtained upon operating the storage device;

a database for a volume performance value which stores information on specification values including a performance value of the storage device;

processing means which calculates a forecasted performance value from the information on the performance value of the disk group stored in the database for operation history and which obtains a performance margin per unit time using the obtained forecasted performance value and a theoretical performance value stored in the database for a volume performance value, wherein the forecasted performance value is an average performance value per unit time based on the operation history, and wherein the theoretical performance is a performance value at which the disk group theoretically exhibits maximum performance, and wherein the performance value at which the disk group theoretically exhibits maximum performance is obtained by multiplying the number of drives in the disk group by the performance of each drive;

volume determination processing means which determines at least one candidate for allocating a volume in accordance with a calculation result of the processing means; and means for transmitting, to a client connected to the storage management server, information indicating the at least one candidate determined by the volume determination processing means.

11. A storage management server according to claim 10, further comprising:

a policy database which stores information on a policy including the performance corresponding to a plurality of set policies.

12. A storage management server according to claim 10, wherein the database for a volume performance value stores a disk group name, reliability, a capacity, the theoretical performance value, and the forecasted performance value corresponding to the disk group.

13. A storage management server according to claim 10, wherein the database for operation history stores a disk group name and an actual estimated performance value corresponding to the disk group.

14. A storage management server according to claim 11, wherein the processing means comprises:

first processing means which obtains the unit time from the designated policy and which segments the history information stored in the database on the operation history per unit time;

second processing means which obtains an average of the segmented data and which obtain the forecasted performance value;

third processing means which obtains the performance margin by subtracting the forecasted performance value from the theoretical performance value per unit time and which subtract the performance value designated by the policy from the performance margin per short time; and fourth processing means which determines whether or not the subtracted value is positive and which determine the volume of the target disk group if the subtracted value is positive.

15. A storage management server according to claim 10, wherein the client comprises:

means for receiving information for allocating the volume selected from the received at least one candidate by the client; and means for transmitting, to the storage device, the information for allocating the volume received by the receiving means so as to allocate the volume of the storage device.

16. A system according to claim 7, wherein the display means of the client displays the information indicating a name, performance, and reliability of the disk group as the at least one allocation candidate.

17. A volume allocating method in a storage management system, comprising:

receiving a condition on requested performance per operating time zone of a volume designated by a client;

referring to history information obtained from a result of actually operating disk groups;

calculating a performance margin of each disk group upon allocating the volumes of the disk groups by subtracting a forecasted performance value from a theoretical performance value, wherein the forecasted performance value is an average performance value per unit time based on the operation history, and wherein the theoretical performance value is a performance value at which the disk group theoretically exhibits maximum performance, and wherein the performance value at which the disk group theoretically exhibits maximum performance is obtained by multiplying the number of drives in the disk group by the performance of each drive;

obtaining at least one volume candidate as an allocation target from the disk groups in accordance with a result of calculating the performance margin and presenting the at least one volume candidate to the client; and receiving and storing one volume candidate selected by the client.

18. A volume allocating method in a storage management system according to claim 17, further comprising the step of:

displaying the at least one volume candidate as the allocation target on a display screen of the client and selecting one volume candidate of the displayed at least one volume candidate.

19. A volume allocating method according to claim 1, further comprising:

displaying information including at least the performance value and reliability corresponding to the policy, an index for selecting a memory capacity, and an index for selecting the policy on the display screen of the client so as to designate the condition for allocating the volume by the client.

20. A volume allocating method according to claim 9, further comprising:

displaying information including at least the performance value and reliability corresponding to the policy, an index for selecting a memory capacity, and an index for selecting the policy on the display screen of the client so as to designate the condition for allocating the volume by the client.

* * * * *